United States Patent

[11] 3,552,254

| | | | |
|---|---|---|---|
| [72] | Inventor | Robert L. Marczy | |
| | | 1455 N. Sandburg Terrace, Chicago, Ill. 60610 | |
| [21] | Appl. No. | 695,789 | |
| [22] | Filed | Jan. 4, 1968 | |
| [45] | Patented | Jan. 5, 1971 | |

[54] APPARATUS FOR GAUGING WORK LENGTHS
13 Claims, 7 Drawing Figs.

[52] U.S. Cl. .................................................. 83/461,
83/468, 83/522, 143/47, 143/174, 269/304,
269/319, 269/320
[51] Int. Cl. ..................................................... B26d 7/16
[50] Field of Search .......................................... 83/461,
467, 468, 268, 269, 391, 393, 522, 416;
143/174—2, 47; 269/304, 305, 306, 320, 319

[56] References Cited
UNITED STATES PATENTS

| | | | | |
|---|---|---|---|---|
| 3,141,367 | 7/1964 | Keener et al. ................. | 83/467X | |
| 3,244,047 | 5/1966 | Daniluk ......................... | 83/269 | |
| 3,370,494 | 2/1968 | Schenck ........................ | 83/467 | |
| 2,520,495 | 8/1950 | Dehn ............................. | 83/416X | |

Primary Examiner—James M. Meister
Attorney—John S. O'Brien

ABSTRACT: Apparatus for gauging work lengths includes a work bed, work stops on the bed individually movable between work-engaging and out of the way positions, means for effecting relative movement between the bed and a tool to vary the distances between the tool and the stops, means for sensing and signalling the relative movement, brake means for arresting the relative movement, work clamp means on the bed movable between clamping and release positions, and remote control means for selectively moving the stops, actuating the relative movement means, deactuating the relative movement means cooperatively with the sensing and signalling means, actuating the brake means, and moving the clamp means.

FIG. 1

Inventor
Robert L. Marczy
By John S. O'Brien
Atty.

APPARATUS FOR GAUGING WORK LENGTHS

BACKGROUND OF THE INVENTION

This invention relates to apparatus for gauging work lengths that is adapted for use with cutoff tools such as saws, cutters, and the like, and other tools operating on the work. More particularly, the invention relates to apparatus for locating a work stop and a tool relative to each other for performing cutting or other operations on articles of wood, metal, plastic, and other materials at preselected locations on the work.

Prior to the present invention, various apparatus has been provided for gauging the cutoff length of work pieces to be cut, including both manually and automatically adjustable apparatus. However, the prior apparatus requires time-consuming manual operations, is not well adapted for cutting relatively long lengths, and/or is excessively complex and uneconomical. Consequently, complete manual operation is commonplace, with work stops being located manually with tape measure, temporarily clamped in place, and remeasured and adjusted for each new length to be cut, all with accompanying time and labor and errors in measurement.

It would be a distinct advantage to suppliers and users of dimensioned work pieces of various materials in quantity to be able to cut or perform other operations on the pieces at various desired lengths or locations, rapidly, accurately, and economically, and with unskilled labor.

SUMMARY OF THE INVENTION

The present invention provides apparatus for gauging work lengths which includes a work bed, work stops on the bed individually movable between work-engaging and out of the way positions, means for reciprocally moving the stops individually between said positions, and mounting means for the bed and a tool adapted to permit reciprocal rectilinear relative movement between the bed and the tool to vary the distances between the tool and the work-engaging positions of the stops. Preferably, means are provided for effecting the relative movement. Remote control means are provided for selectively actuating the stop moving means, for actuating the relative movement effecting means, and for deactuating the relative movement effecting means. The apparatus may be set for precisely cutting or performing other operations on relatively long lengths of material, which may be varied as frequently as desired, by remote operation and with no necessity for manual adjustments, careful measurements, walking back and forth along a work table with consequent delays, or skilled operation.

A preferred embodiment of the invention provides clamp means mounted on the bed for reciprocal movement between work clamping and release positions, means for reciprocally moving the clamp means, and remote control means for actuating the clamp moving means. A further embodiment provides means for sensing and signalling the relative movement, with the control means deactuating the relative movement effecting means cooperatively with the sensing and signalling means. Also provided are brake means for arresting the relative movement between the bed and the tool, actuated by the control means upon deactuation of the relative movement effecting means. The foregoing preferred embodiments further enhance the utility, efficiency, simplicity and reliability of the gauging apparatus.

The invention provides very substantial savings in the time and labor required for cutting lengths of lumber, pipe, tubing, structural steel, or other articles of wood, plastic, metal, and other materials. The apparatus operates automatically, accurately, and safely. Unskilled labor may be utilized. The apparatus may be employed with any of various cutoff tools, including traversing circular saws, band saws, abrasive saws, shears and other cutters of various types, and like cutting tools. The apparatus also may be employed with other tools to perform various operations on the work at desired locations thereon. Examples of such other tools are marking and drilling tools.

BRIEF DESCRIPTION OF THE DRAWINGS

The attached drawings illustrate the preferred embodiments of the invention, without limitation thereto. In the drawings, like elements are identified by like reference symbols in each of the views, and.

DESCRIPTION OF THE PREFERRED EMBODIMENT

Figure 1:
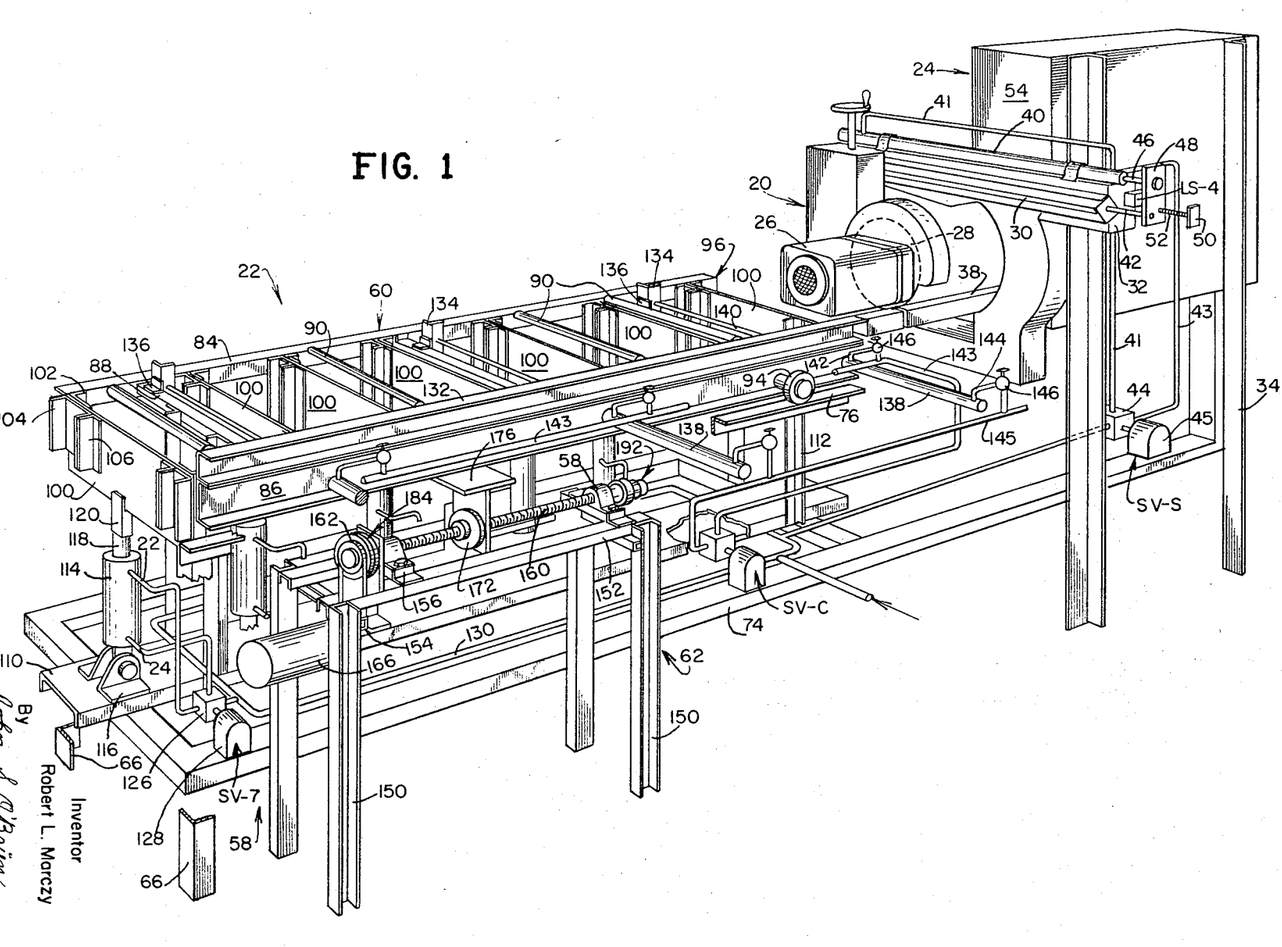
FIG. 1 is a schematic fragmentary rear perspective view, with parts broken away and omitted for clarity, of an assembly of a cutoff saw and gauging apparatus according to the invention.
Figure 2:
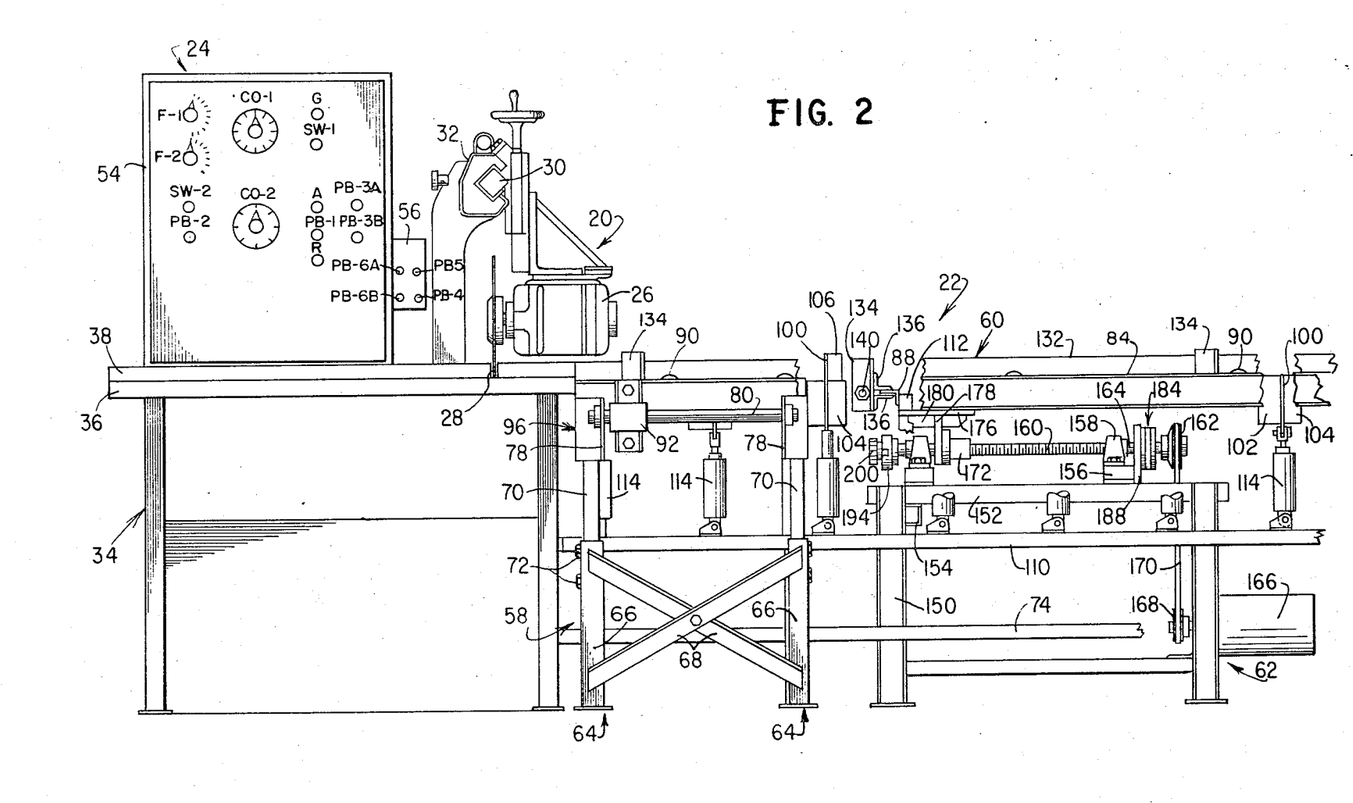
FIG. 2 is a fragmentary front elevational view thereof, with parts broken away and omitted.
Figure 3:
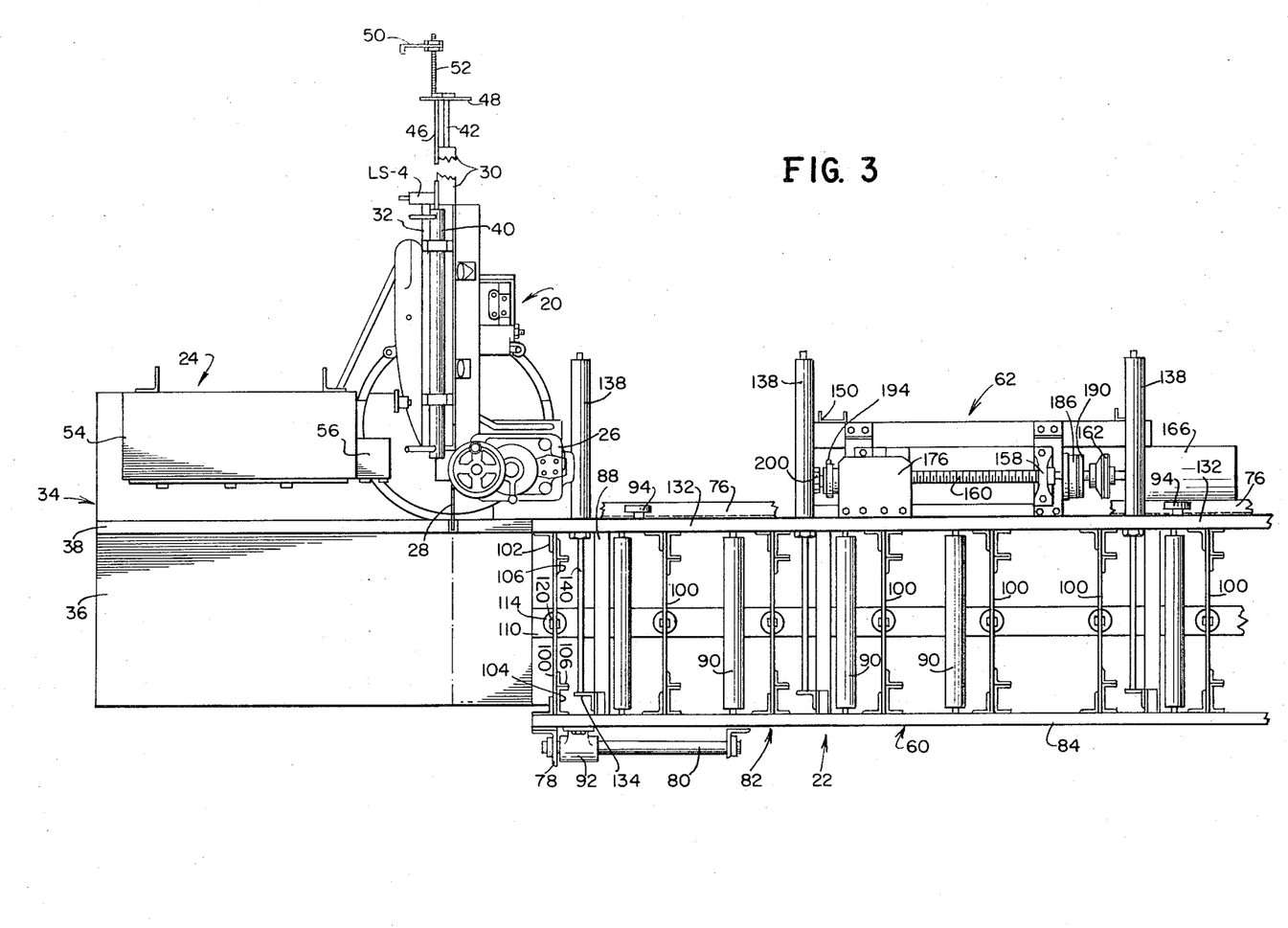
FIG. 3 is a fragmentary top plan view thereof.

Referring to the drawings, particularly FIGS. 1—3, the illustrative preferred assembly includes a cutoff or traversing saw 20, a gauge assembly 22, and an electrical remote control system 24. The saw is of conventional design, and includes a saw motor 26 mounting a circular blade 28, the motor being mounted on a guide bar or ram 30. The guide bar is slidably mounted in a guide channel or housing 32, for traversing the work. The saw is mounted on a suitable fixed stand 34, on which is mounted a work table 36 having a fence or rail 38 along the inner or back longitudinal margin thereof.

The saw 20 is adapted for automatic operation in the present invention by mounting a traversing air cylinder 40 on the guide channel 32. Flexible air lines 41 and 43 are connected to the cylinder and the supply of air thereto is controlled by a solenoid valve SV-S having valve 44 and solenoid 45 components. A connecting rod 42 is secured to and projects rearwardly from the guide bar 30. The piston rod 46 extending from the cylinder 40 and the connecting rod 42 are rigidly joined by a connecting plate 48, for movement of the guide bar with the piston rod. A saw limit switch LS-4 is mounted on the inner end of the guide channel 32. A saw limit bar 50 is adjustably mounted on the connecting plate 48 by a screw 52 extending rearwardly from the connecting plate. The limit bar is arranged to actuate the limit switch at the forward limit of travel of the saw motor 26 as regulated by the adjustment of the screw 52.

The control system 24 is housed in a panel box 54 and a switch box 56 thereon, and the panel box is mounted on the stand 34 adjacent to the saw 20. The operation of the saw and of the gauge assembly 22 is completely controlled from the panel and switch boxes, as described hereinafter. Otherwise, the operator need only place the work pieces on the table 36 and the gauge assembly 22 and remove the cut pieces therefrom.

The gauge assembly 22 includes a fixed base 58, a work bed or carriage 60 movably mounted thereon, and a fixed bed drive assembly 62. The gauge assembly is mounted in predetermined dimensional relationship to the saw 20 for cutting precise predetermined lengths of lumber.

The base 58 of the gauge assembly includes pairs of telescopically adjustable legs 64 having foot members 66 joined by cross braces 68, and extensions 70 vertically slidable in the foot members. The extensions are secured to the foot members by bolts 72.

Figure 4:
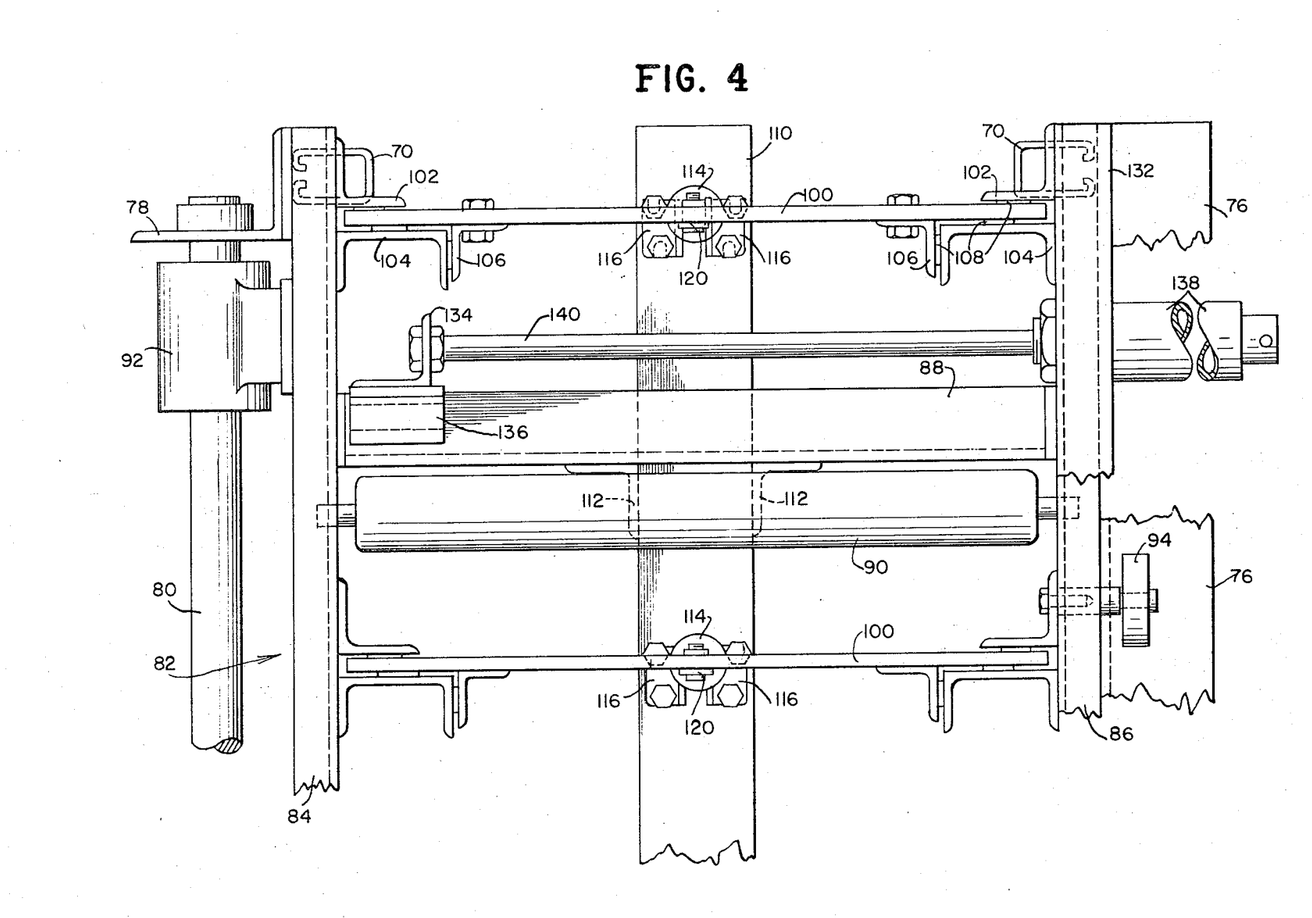
FIG. 4 is an enlarged fragmentary top plan view of one end of the work bed thereof and members mounted thereon, with parts broken away.

The base also includes a wiring duct 74 mounted on the foot members 66, and a wheel track 76 secured to the leg extensions 70 (see also FIG. 4). Bed mounting plates 78 are secured to the leg extensions 70 on the front side of the base. A slide rod 80 is secured to a pair of mounting plates 78 on each pair of leg extensions 70 and extends horizontally therebetween.

Referring to FIGS. 1—4, the work bed 60 includes a frame 82 having spaced parallel front and back side bars 84 and 86, respectively, joined together by spaced parallel cross bars 88 that are perpendicular to the side bars. A series of idler rollers 90 are rotatably mounted on the side bars and extend therebetween in spaced parallel relationship along the frame. The rollers form an upper work-carrying surface on the bed 60.

Ball bushings or bearings 92 are fixedly secured to the front side frame bar 84 at spaced locations therealong. Each slide rod 80 is inserted through and supports one of the bushings, thereby providing longitudinally and horizontally slidable support for the front side of the bed 60. A plurality of wheels 94 are rollably mounted on the back side frame bar 86 and project outwardly therefrom. The wheels are arranged to travel on the track 76, supporting the back side of the bed 60 for longitudinal movement therealong. In this manner, the work bed is mounted on the base 58 for reciprocal rectilinear horizontal movement on the base to and from the end 96 thereof adjacent to the saw 20, and also to and from the cutting plane of the saw blade 28.

A series of work stops or stop plates 100 are mounted on the bed 60 for reciprocal vertical movement thereon. The stops are arranged in regularly spaced parallel relation along the bed frame 82 and extend between the frame side bars 84 and 86 perpendicularly thereto. The stops are spaced at predetermined distances along the frame, at one foot intervals in the illustrative embodiment. Any number of stops may be employed, for cutting any length of work piece, and in one embodiment for use in cutting lumber, eighteen stops are provided.

The opposite ends of the stops are inserted between vertically extending angle guide bars 102 and spaced channel guide bars 104 secured to the frame side bars 84 and 86. Angle guide bars 106 are secured to the stops in spaced relation to their ends, and one side of each bar is adjacent and parallel to the inner side of each channel guide bar. Flat bearings 108 are secured to the guide bars 102 and 104 and are interposed between such bars and the ends and the guide bars 106 of the stops, to facilitate vertical sliding movement of the stops.

A cylinder support bar 110 is supported from the bed 60 therebelow by hanger bars 112 secured to the frame cross bars 88. Air stop cylinders 114 are pivotally mounted on brackets 116 secured on the support bar 110, with one cylinder mounted below each of the work stops 100. The piston rod 118 of each cylinder is connected to the lower margin of each work stop by a clevis 120. Extension and retraction of the piston rod vertically reciprocally moves the attached work stop between a work-engaging position extending outwardly or upwardly from the work-carrying surface provided by the rollers 90 and an out of the way position disposed inwardly or below the work-carrying surface.

Each stop cylinder 114 is provided with flexible air supply lines 122 and 124, above and below the piston thereof. The supply lines are connected to an air valve 126 of a solenoid valve mounted on the wiring duct 74, the solenoid valve for the several cylinders being identified successively as SV-1 to SV-18. Each air valve is connected to a manifold conduit 130, in turn connected to a source of compressed air, not shown. Each valve is operated by a solenoid 128 electrically connected in the control system 24. The above-described solenoid valve SV-S is connected to the air and control systems in like manner.

A back side fence or rail 132 is mounted on the back side frame bar 86 therealong, with its front face aligned with the front face of the work table fence 38. A series of clamps 134 in the form of vertically extending angle bars are secured to slides 136 that embrace the frame cross bar 88 for sliding movement thereon transversely of the bed frame 82. The clamps extend upwardly beyond the upper surfaces of the bed rollers 90, for clamping the work against the inner surface of the fence 132.

An air cylinder 138 is provided for each clamp, and the cylinders are mounted on the back side frame bar 86. A piston rod 140 of each cylinder is connected to a clamp 134, for reciprocally moving the clamp across the bed 62 alternately to clamp the work against the fence 132 in position for being cut and to release the work. The clamp cylinders 138 have their air supply lines 142 and 144 connected via manifold pipes 143 and 145 and flexible connections to a common solenoid valve SV-C, for operation in unison. Valves 146 are provided in the supply lines of each cylinder, for taking any of the clamps out of service when not needed. The solenoid valve SV-C is connected to the air and control systems in like manner to the above-described solenoid valves.

Figures 5, 6:
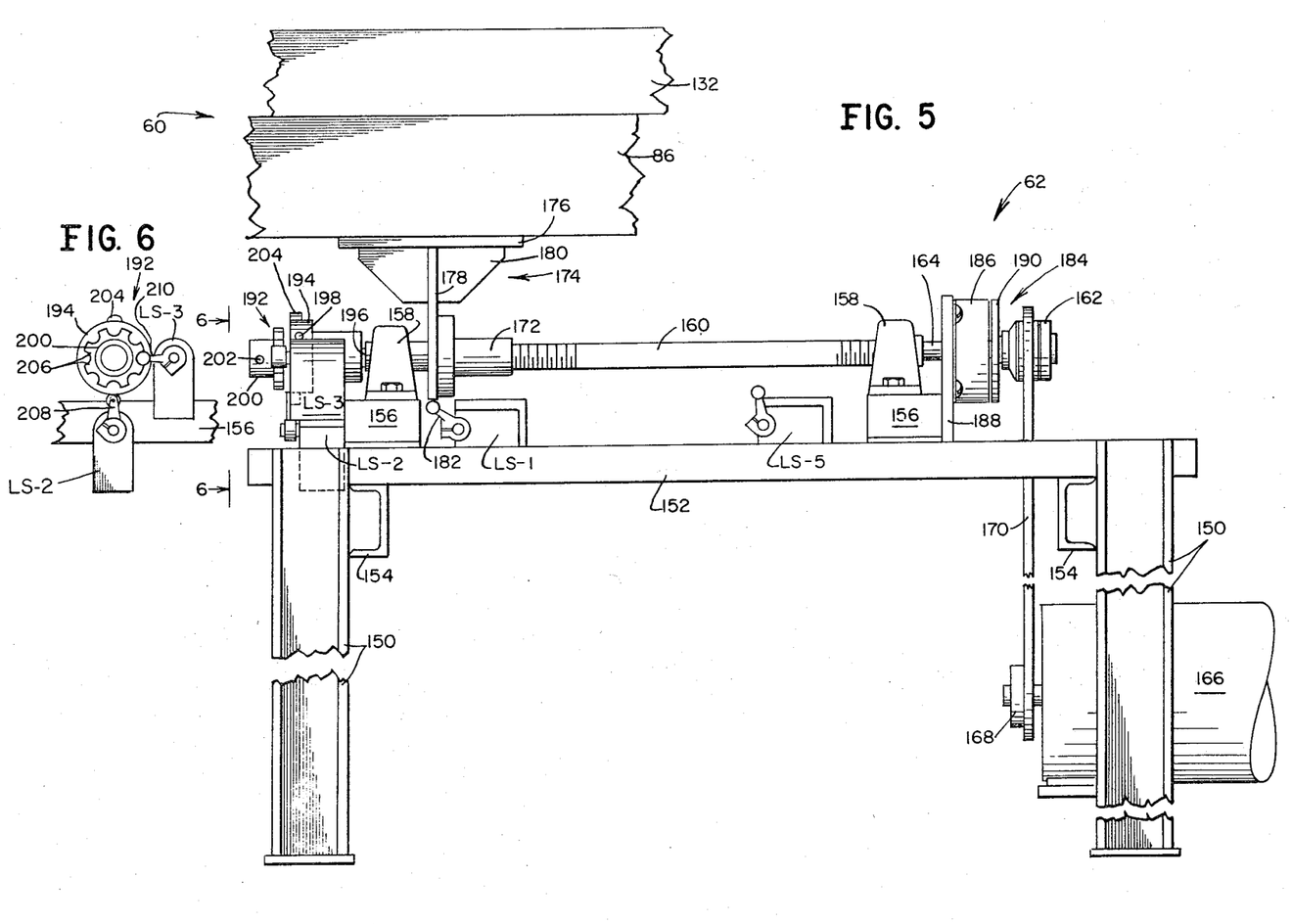
FIG. 5 is an enlarged fragmentary broken front elevational view of the bed drive assembly thereof.
FIG. 6 is an enlarged end view of sensing and signalling members associated with the bed drive assembly, taken on line 6—6 of FIG. 5.

Referring particularly to FIGS. 1, 5 and 6, the bed drive assembly 62 includes a fixed frame having supports or legs 150, longitudinally extending frame members 152, and transversely extending frame members 154, all secured together such as by welding. Two spaced apart cross members 156 are mounted on the upper frame members 152, and a pillow block 158 is mounted on each cross member. A screw 160 is journaled in the pillow blocks. In the illustrative embodiment, the screw is a 1-inch pitch ball screw. A combination pulley and slip clutch 162 is mounted on the screw shaft 164 at one end of the screw. A reversible gear motor 166 is mounted on the drive assembly frame, and a pulley 168 is mounted on the shaft thereof. A drive belt 170 is trained on the motor and screw pulleys, for turning the screw 160 by the motor, in either direction.

The screw engages a flanged nut 172 for longitudinal movement of the nut as the screw is rotated. The bed 60 and the nut 172 are interconnected by a drive bracket 174. The bracket includes a horizontal top plate 176 secured to the back side frame bar 86, a vertical connecting plate 178 secured to the top plate and to the nut, and a strut plate 180 secured to the top plate and to the connecting plate. In the illustrative embodiment, the screw 160 provides for a 13 inch travel of the nut 172 and of the bed 60 therewith.

A starting limit switch LS-1 is mounted on an upper frame member 152 for engagement of its lever arm 182 by the drive bracket connecting plate 178 in the starting position of the bed. The limit switch has two operative switch members LS-1A and LS-1B corresponding to the engaged and disengaged positions of the lever arm 182, as described hereinafter in connection with FIG. 7. A safety stop limit switch LS-5 is also mounted on the upper frame member 152, adjacent the opposite end of the screw 160, for engagement with the plate 178 to prevent overtravel.

An electromagnetic brake assembly 184 is associated with the screw shaft 164 adjacent the pulley 162. The brake assembly is conventional (Warner Electric Brake & Clutch Co., RF Series), and it includes a coil 186 on a mounting plate 188 secured to a cross member 156, and a magnetizable brake plate 190 fixed to the screw shaft for rotation therewith. Energization of the coil attracts the plate thereto and stops the rotation of the screw.

A counter assembly 192 is mounted at the opposite or leading end of the screw 160, for sensing and signalling the rotation of the screw and thus the movement of the bed 60. The assembly includes a collar 194 adjustably mounted on the screw shaft 196 by a setscrew 198, and a sprocket 200 adjustably mounted on the shaft 196 by a setscrew 202. The collar is provided with a single boss 204. The illustrative sprocket has eight teeth 206.

Mounted on a cross member 156 are an inch signalling limit switch LS-2 having a roller-bearing lever arm 208, and a fractional inch signalling limit switch LS-3 having a roller-bearing lever arm 210. The lever arm 208 of the inch signalling switch LS-2 is engaged by the boss 204 once each revolution of the screw 160, representing one inch of travel of the nut 172 and of the bed 60 in the illustrative embodiment. The switch thus closes and transmits a signal for each revolution of the screw, to an electrical counter CO-1, described hereinafter with reference to FIGS. 2 and 7. The lever arm 210 of the fractional inch switch LS-3 is engaged each one-eighth of a revolution by one of the teeth 206, closing the switch and transmitting a signal for each one-eighth of an inch of travel of the nut 172 and of the bed 60, to a counter CO-2, also described hereinafter.

The gauge assembly 22 is mounted with the end 96 of its base 58 adjacent to the saw 20, and the work bed 60 extending longitudinally away from the plane of the saw blade 28. The first work stop 100 at the leading end of the bed is spaced a predetermined distance from the saw blade, and the successive work stops are spaced at one-foot intervals therefrom. For example, the leading stop bar 100 may be spaced one foot away from the saw blade 28, and each succeeding work stop will be spaced from the saw blade in multiples of one foot. A selected stop plate corresponding to the desired length of cut may be raised by its cylinder 114. A work piece may be placed on the work table 36 and on the bed 60, butted against the work stop, and the selected length cut by the saw.

The bed drive assembly 62 provides for adjustment of the positions of the stops 100 in inches and fractions of one inch. Thus, rotation of the screw 160 serves to move the bed 60 away from the plane of the saw blade 28 to any desired extent within one foot, with the work stops moving the same distance. The stops, therefore, are spaced at their initial distances from the saw blade, plus the extent of movement of the bed by the screw 160. With a selected stop raised and moved with the bed in this manner, a work piece may be butted against the stop and cut precisely to the desired length in feet, inches, and fractions of an inch, in this case one-eighth inch fractions.

In practice, it has been found that in order to obtain the desired precision, the starting position of the first work stop 100 preferably is less than an even number of feet from the saw blade 28, e.g., is spaced eleven inches instead of one foot therefrom. The bed then must be moved one inch by the screw 160 to space the stops 100 at even one foot intervals from the saw blade. Also, the initial setting of the boss 204 in the counter assembly is adjusted for less than one complete revolution for indicating the first inch of bed travel. These adjustments accommodate the time lag in the operation of the illustrative electromechanical system. Similarly, adjustment is made in the setting of the fractional inch counter CO-2 to provide for such time lag.

Figure 7:
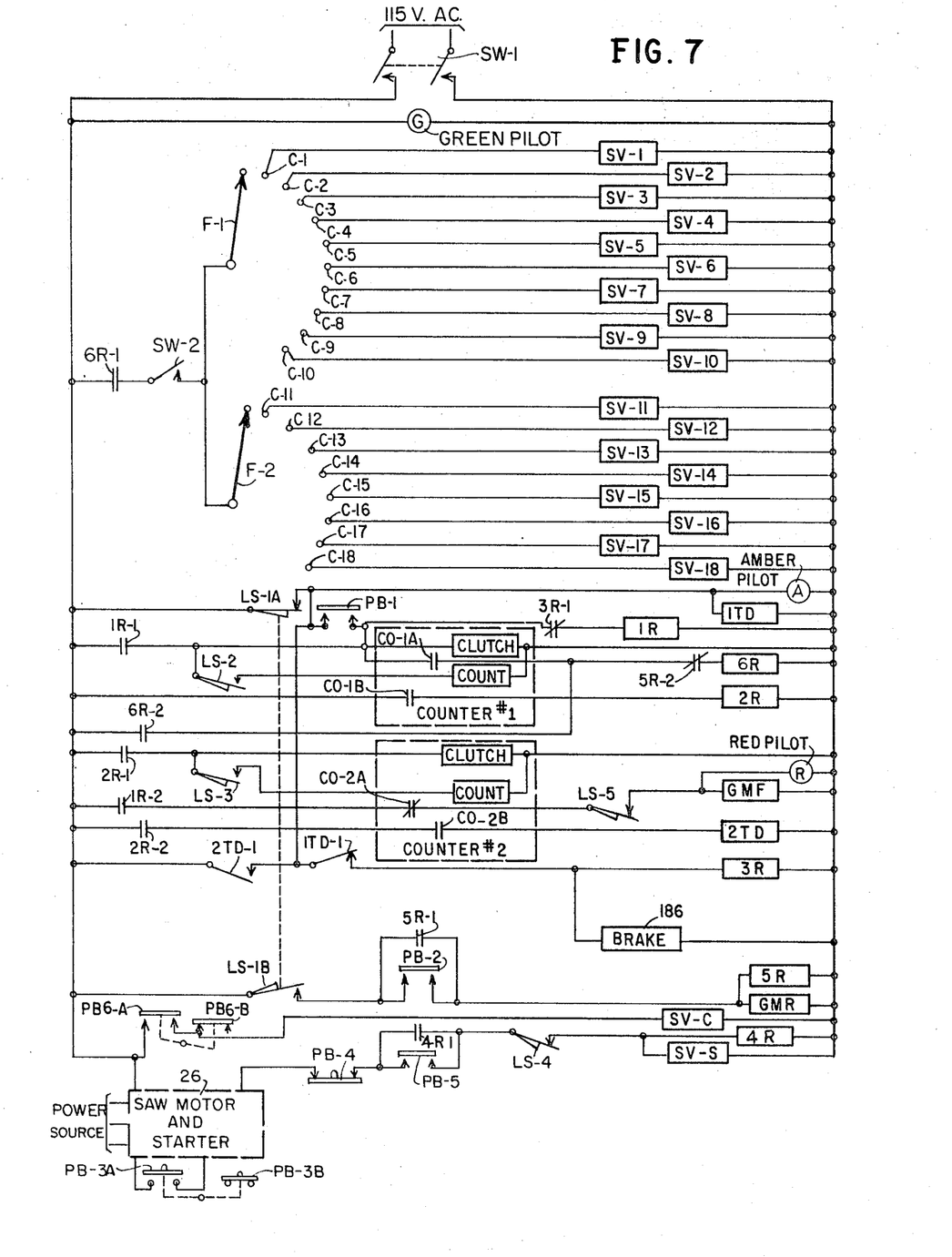
FIG. 7 is a circuit diagram illustrating the control system thereof.

Referring to FIGS. 2 and 7, control instrumentalities mounted on the panel box 54 and the switch box 56 include a two-position master switch SW-1 and a pilot light G signalling current flow in the main circuit. A two-position main stop plate switch SW-2 controls operation of the solenoid valves SV-1 to SV-18. Dial switch F-1 is a selector alternately closing circuits through contacts C-1 to C-10, operating solenoid valves SV-1 to SV-10 for operating the first ten work stops 100 individually. Similarly, dial switch F-2 alternately closes circuits through contacts C-11 to C-18 and solenoid valves SV-11 to SV-18, for operating the successive eight work stops 100. The eighteen positions of the dial switches F-1 and F-2 correspond to work stop settings from one to eighteen feet from the saw blade 28. The solenoid valves SV-1 to 18 are spring-loaded two-position units which when energized regulate their valves to admit air to their cylinders 114 so as to raise the work stops 100 to their work-engaging positions, and which when deenergized regulate their valves by spring tension to redirect the flow of air to their cylinders 114 for retracting the work stops to their out of the way positions.

Counters CO-1 and CO-2 are conventional electromagnetic counters operating in response to input electrical pulses (Eagle Signal Microflex Counter HZ42A 6B 241 and HZ42A6B 231, respectively). Each counter includes a clutch coil and a count coil, schematically illustrated in FIG. 7 and identified as "Clutch" and "Count," respectively. The dial of counter CO-1 is set for the desired number of inches of cut beyond the foot setting, and it is responsive to the pulses transmitted by limit switch LS-2. The dial of counter CO-2 is set for the desired fraction of an inch cut beyond the foot and inch settings, and it is responsive to the impulses transmitted by limit switch LS-3. The counter assembly 192 and the counters CO-1 and CO-2 thus constitute means for gauging selected distances of movement of the bed 60.

Pushbuttons PB-3A and PB-3B are saw motor start and stop buttons, respectively. Pilot light A indicates the disposition of the work bed 60 in its starting position, a circuit then being closed through the pilot light and the switch member LS-1A of the starting limit switch LS-1.

Bed adjustment pushbutton switch PB-1 initiates adjustment of the work bed 60 to the desired gauge setting. The switch serves for energizing the counters CO-1 and CO-2 and closing circuits to the selected solenoid valve SV-1 to 18 and to the forward starter coil of the gear motor 166, the coil being represented schematically and identified as "GMF" in FIG. 7. The control system functions automatically to deenergize the gear motor and energize the brake coil 186 for arresting bed movement when counters CO-1 and CO-2 have reached their full counts. A pilot light R indicates energization of the forward motor coil GMF.

Clamping pushbutton switch PB-6A serves to energize the clamp solenoid valve SV-C for operating the air cylinders 138 and the clamps 134 to clamp the work on the bed. Release pushbutton PB-6B serves to operate the clamp cylinders and clamps for restoring the clamps to their initial positions and releasing the work. The solenoid valve SV-C is a spring-loaded two-position unit operating as described above for the solenoid valves SV-1 to 18.

Sawing pushbutton switch PB-5 serves to energize the cut solenoid valve SV-S, for supplying air to the saw traversing cylinder 40 and causing the saw motor and blade to traverse the work. The switch is connected in a circuit through the saw motor 26, for operation of the traversing cylinder only when the saw blade 28 is rotating. An emergency stop pushbutton switch PB-4 is operable to stop the cutting traverse of the saw. The solenoid valve SV-S is a spring-loaded two-position unit as described for the valves SV-1 to 18. The solenoid valve SV-S is deenergized by operation of the saw limit switch LS-4 at the forward limit of traverse and also by operation of the stop switch PB-4, whereupon the saw traversing cylinder 40 is operated to retract the saw to its starting position.

Reset pushbutton switch PB-2 serves to operate the gear motor 166 in its reverse direction, energizing its reverse coil, schematically illustrated and identified as "GMR" in FIG. 7. The motor restores the work bed 60 to its starting position, at which location the switch member LS-1B of starting limit switch LS-1 opens to deenergize the gear motor. The starting limit switch member LS-1A closes, energizing the brake coil 186 for arresting movement of the work bed.

The mechanical operation of the saw and gauging apparatus assembly is as follows: Master switch SW-1 and main stop plate switch SW-2 are closed, and saw motor starting switch button PB-3A is pushed to start the saw motor 26. Dial switch F-1 or dial switch F-2 is set to the desired length of cut, in feet. Counters CO-1 and CO-2 are set to the desired additional length of cut in inches and fractions of an inch, respectively. Bed adjustment switch button PB-1 is pushed, whereupon a work stop 100 corresponding to the length of cut in feet is raised, and the work bed 60 is shifted away from the saw a distance equal to the selected additional length of cut in inches and fractions of an inch.

The work to be cut is placed on the work table 36 and the work bed 60, against the aligned fences 38 and 132, and the work is butted up against the raised work stop 100. The clamping switch button PB-6A is pushed, whereupon the work is clamped against the fence 132 by the clamps 134.

The sawing switch button PB-5 is pushed, and the saw blade 28 traverse the work table 36 and cuts the work thereon, and then returns to its starting position behind the table. The clamp release button PB-6B is pushed, retracting the clamps 134 from the work. The cut pieces are removed from the work table 36 and the work bed 50.

To cut additional work to the same length, the work is located on the work table 36 and the work bed 60 against the work stop 100, as before. The work is clamped, cut, released, and removed in the same manner as before.

To cut work to a different length, or to restore the apparatus to its starting position, reset switch button PB-2 is pushed, restoring the work bed 60 to its starting position. The foregoing operations are repeated at new settings of the dial switch F-1 or F-2 and the counters CO-1 and CO-2 for cutting a different length. Operation is discontinued by pushing the saw motor stop switch button PB-3B, and turning off the master switch SW-1 and the main stop plate switch SW-2.

Referring to the circuit diagram FIG. 7, the operation is controlled as follows:

1. The master switch SW-1 is closed by the operator, lighting pilot light G. With work bed 60 in its starting position, the switch member LS-1A of starting limit switch LS-1 is closed, thereby energizing a reset timing relay 1TD and lighting pilot light A. Normally closed timing relay switch 1TD-1 is closed, and a circuit is closed through be 3R and the coil 186 of the brake 184, braking the screw 160 and thus also the work bed 60. Normally closed contact 3R-1 is opened by relay 3R, to prevent operation of counters CO-1 and CO-2. After a predetermined time delay, e.g., 2—3 seconds, reset timing relay 1TD opens its switch 1TD-1, deenergizing brake coil 186 and relay 3R. Contact 3R-1 closes when relay 3R is deenergized. The foregoing braking sequence is provided for return of the work bed following operation at one of the gauge settings, as described hereinafter. The gauge assembly thereafter may set for the desired length of cut.

2. Main stop plate switch SW-2 is closed by the operator. Saw motor starting switch PB-3A is closed by the operator, starting the motor.

3. The pointer of either stop plate dial switch F-1 or dial switch F-2 is set by the operator to make a circuit with the appropriate contact C-1 to C-18, and solenoid valve SV-1 to SV-18, respectively, corresponding to the desired work stop 100. A normally open contact 6R-1 maintains the circuits open while the switch F-1 or F-2 is set.

4. The pointer of inch counter CO-1 is set by the operator for the desired number of inches, and the pointer of fractional inch counter CO-2 is set for the desired fraction of an inch.

5. Bed adjustment switch PB-1 is closed by the operator, closing a circuit through closed contact 3R-1 and relay 1R. Normally open contact 1R-1 in circuit with the electromagnetic clutch coil of inch counter CO-1 is closed by relay 1R, setting the counter for operation and making a holding circuit through relay 1R.

6. The clutch coil of inch counter CO-1 closes a normally open contact CO-1A, in the counter, in circuit with a normally closed contact 5R-2 and a relay 6R. The relay closes contact 6R-1 in circuit with the main stop plate switch SW-2 and with one of the solenoid valves SV-1 to 18 for the selected work stop 100, to raise the stop. The relay 6R also closes a contact 6R-2, to make a holding circuit through the relay.

7. Relay 1R also closes normally open contact 1R-2 in circuit with a normally closed contact CO-2A in fractional inch counter CO-2, with closed safety limit switch LS-5, with pilot light R, and with forward starter coil GMF of gear motor 166. The gear motor drives the screw 160, moving the work bed 60 out of its starting position, and opening switch member LS-1A and closing switch member LS-1B of starting limit switch LS-1. Reset timing relay 1TD is deenergized, and its switch 1TD-1 closes.

8. As the screw 160 rotates, inch signalling limit switch LS-2 in circuit with the count coil of inch counter CO-1 is closed once each revolution, pulsing the circuit coil. When the preset inch value is reached by the counter, a normally open counter contact CO-1B in circuit with a relay 2R is closed by the counter, energizing the relay, and counter contact CO-1A is opened.

9. The relay 2R then closes a contact 2R-1 in circuit with the clutch coil of fractional inch counter CO-2, setting the counter for operation. As the screw 160 rotates, fractional inch signalling limit switch LS-3 in circuit with the count coil of fractional inch counter CO-2 is closed once each one-eighth of a revolution. After the counter is energized in the foregoing manner following operation of inch counter CO-1, the count coil of counter CO-2 is pulsed by operation of the fractional inch limit switch LS-3. When the preset fractional inch valve is reached by counter CO-2, a normally closed counter contact CO-2A is opened by the counter, deenergizing the forward coil GMF of gear motor 166, to stop the motor. Safety stop limit switch LS-5 prevents overtravel by operation of the motor. 10. Relay 2R when energized also closes a contact 2R-2 in circuit with a normally open counter contact CO-2B and an adjustment timing relay 2TD. Fractional inch counter CO-2 closes the contact CO-2B when the count is complete, energizing the timing relay. Timing relay 2TD closes its normally open switch 2TD-1 in circuit with closed reset timing relay switch 1TD-1, brake coil 186 and relay 3R, braking the screw 160 and the work bed 60 to prevent overtravel due to momentum.

11. Relay 3R opens contact 3R-1, deenergizing relay 1R and opening contacts 1R-1 and 1R-2. Counters CO-1 and CO-2 and relay 2R are deenergized, opening contacts CO-1B, 2R-1, 2R-2, and CO-2B. Contact CO-2A closes. Adjustment timing relay 2TD is deenergized. After a predetermined time delay, the timing relay switch 2TD-1 opens, deenergizing the brake coil 186 and relay 3R.

12. The operator places the work to be cut on the bed 60 against the raised stop 100, and then closes clamping switch PB-6A to energize clamp solenoid valve SV-C for clamping the work against the fence 132, in position for sawing.

13. The operator closes sawing switch PB-5, making a circuit through the saw motor 26, emergency stop switch PB-4, normally closed saw limit switch LS-4, and cut solenoid valve SV-S and also relay 4R. The relay closes contact 4R-1, making a holding circuit for the cut solenoid. The saw blade 28 traverses the work table 36 and cuts the work thereon. When the saw limit bar 50 engages the limit switch LS-4, the switch opens to break the solenoid circuit. The solenoid valve SV-S is restored to its initial position, and the saw blade is retracted from the work table. Operation of the emergency stop switch PB-4 will break the solenoid circuit and retract the saw blade in like manner.

14. The work cut to the desired length is released for removal from the bed by operating clamp release pushbutton PB-6B to open the clamping switch PB-6A, thereby deenergizing the clamp solenoid valve SV-C and retracting the clamps 134.

15. Additional work may be cut to the same length by closing clamping switch PB-6A to energize the clamp solenoid valve SV-C for clamping the new work in position for sawing. Sawing switch PB-5 then is closed, to cause the saw blade to traverse the work table and cut the work. The work is released by operating release pushbutton PB-6B.

16. To set the gauge assembly for a new cutting length, or to restore the apparatus to its starting position, reset switch PB-2 is closed, making a circuit through closed limit switch contact LS-1B and gear motor reverse coil GMR, and also relay 5R. The relay closes contact 5R-1, making a holding circuit for the motor coil. The relay also opens contact 5R-2 to deenergize relay 6R. Contacts 6R-1 and 6R-2 then open, deenergizing the previously selected one of the solenoid valves SV-1 to 18 and restoring its work stop 100 to retracted position. The gear motor 166 rotates the screw 160 to return the work bed 60 to its starting position. Engagement of the drive bracket plate 178 with the starting limit switch LS-1 closes the switch member LS-1A and opens the switch member LS-1B. The gear motor is deenergized by opening the member LS-1B. With master switch SW-1 and the limit switch member LS-1A closed, the above-described initial operation of the brake 184 takes place stopping the rotation of the screw 160 and the movement of the work bed 60 due to momentum.

17. Additional work may be cut to a different length by repeating the foregoing operational cycle, with the master switch SW-1, the saw motor start switch PB-3A, and the main stop plate switch SW-2 remaining closed. Operation may be discontinued by operating the saw motor stop pushbutton PB-3B and opening the master switch SW-1. Main stop plate switch SW-2 also is opened.

The illustrative embodiment of the invention has been found to be very efficient, making precise cuts at fractional inch increments in various lengths with material savings in time and labor. For example, time study on use of the apparatus for cutting lumber for prefabricated houses indicated that the production rate was double that obtained with the prior method involving manual measurements and adjustments. The simple setting of the apparatus practically eliminated measuring errors, in turn eliminating costly delays in the assembly line. The ability to use unskilled labor for operating the apparatus reduced the prior rapid turnover of semiskilled help and provided substantial additional savings in labor costs.

While a preferred embodiment of the invention has been illustrated and described, it will be apparent that various changes and modifications may be made in the construction and arrangement of the components. Thus, for example, inasmuch as either the work bed 60 or the saw 20, or both, may be moved to provide the desired relative movement therebetween to adjust for inches and fractional inches in the length of cut, the saw may, alternatively, be mounted for movement in slideways, or in other conventional manner, and means may be provided for reciprocally moving the saw to and from the work bed, instead of moving the bed to and from the saw. The saw position may be adjusted and the adjustment controlled in the same or similar manner as for the work bed. The illustrative embodiment is, however, more versatile, inasmuch as the gauge assembly 22 is self-contained, requires little or no alteration of the cutoff or other tool with which it is employed, and may be employed together with its controls readily and efficiently with any of various tools, including existing installations.

It is also within the scope of the invention to dispense with the bed drive assembly 62, especially for reducing the cost of the installation. In such case, a ruler or other measuring device may be mounted on the work table 36 and a pointer or other indicator may be mounted on the work bed 60, for example. The bed 60 then may be moved manually by the operator standing at the work table, to adjust the bed setting while observing the position of the pointer relative to the ruler. Suitable means operable from adjacent the work table may be provided for locking or clamping the bed in any adjusted position while operating on the work. It will be apparent, however, that the illustrative embodiment is uniquely adapted for high production rates, simple and accurate operation, and use by unskilled labor.

Other changes, modifications, and variations in construction and arrangement of the parts may be made within the spirit and scope of the invention, as will be apparent to those skilled in the art. It is intended that all such changes, modifications and variations be included within the scope of the appended claims.

I claim:

1. Apparatus for gauging work lengths which comprises:
   a base having an end adapted to be disposed adjacent a tool operating on the work;
   a work bed;
   means mounting said bed on said base for reciprocal rectilinear movement thereon to and from said end thereof;
   a plurality of work stops mounted on said bed for reciprocal movement between respective work-engaging positions at predetermined different distances along the bed in the direction of bed movement and out of the way positions;
   means for reciprocally moving said stops individually between said positions;
   means for reciprocally moving said bed on said base, whereby the distances between said work-engaging positions of said stops and said bed end may be varied;
   means for sensing and signalling said bed movement;
   clamp means mounted on said bed for reciprocal movement thereacross for clamping the work in position for being cut and for releasing the work;
   means for reciprocally moving said clamp means; and
   remote control means for selectively actuating said stop moving means, for actuating said bed moving means, for deactuating said bed moving means cooperatively with said sensing and signalling means, and for actuating said clamp moving means.

2. Apparatus as defined in claim 1 including brake means for arresting said bed movement and actuated by said control means upon deactuation of said bed moving means.

3. Apparatus as defined in claim 1 wherein said work stops comprise plate members extending transversely of said direction of bed movement and mounted for reciprocal movement between work-engaging positions extending outwardly from a work-carrying surface on said bed and out of the way positions disposed inwardly of said surface.

4. Apparatus as defined in claim 1 wherein said bed moving means comprises power-driven screw means, and said sensing and signalling means senses the rotation of said screw means and transmits signals to said control means quantitatively corresponding to the amount of said rotation.

5. Apparatus as defined in claim 4 including brake means associated with said screw means for arresting rotation thereof and actuated by said control means upon deactuation of said bed moving means.

6. Apparatus for gauging work lengths which comprises:
   a work bed;
   a plurality of work stops mounted on said bed for reciprocal movement between respective work-engaging positions at predetermined different distances along the bed and out of the way positions;
   means for reciprocally moving said stops individually between said positions;
   mounting means for said bed and a tool operating on the work adapted to permit reciprocal rectilinear relative movement between the bed and the tool to vary the distances between the tool and said work-engaging positions of said stops;
   brake means for arresting said relative movement;
   means for gauging selected distances of said relative movement; and
   means cooperative with said gauging means for actuating said brake means at gauged distances of said relative movement.

7. Apparatus as defined in claim 6, including means for selectively actuating said stop moving means.

8. Apparatus for gauging work lengths which comprises:
   a work bed;
   a plurality of work stops mounted on said bed for reciprocal movement between respective work-engaging positions at predetermined different distances along the bed and out of the way positions;
   means for reciprocally moving said stops individually between said positions;
   mounting means for said bed and a tool operating on the work adapted to permit reciprocal rectilinear relative movement between the bed and the tool to vary the distances between the tool and said work-engaging positions of said stops;
   means for effecting said relative movement;
   remote control means for selectively actuating said stop moving means, for actuating said relative movement effecting means, and for deactuating said relative movement effecting means; and
   means for sensing and signalling said relative movement, said control means deactuating said relative movement effecting means cooperatively with said sensing and signalling means.

9. Apparatus for gauging work lengths which comprises:
   a base having an end adapted to be disposed adjacent a tool operating on the work;
   a work bed;
   means mounting said bed on said base for reciprocal rectilinear movement thereon to and from said end thereof;

a plurality of work stops mounted on said bed for reciprocal movement between respective work-engaging positions at predetermined different distances along the bed in the direction of said bed movement and out of the way positions;

means for reciprocally moving said stops individually between said positions;

means for reciprocally moving said bed on said base, whereby the distances between said work-engaging positions of said stops and said bed end may be varied;

remote control means for selectively actuating said stop moving means, for actuating said bed moving means, and for deactuating said bed moving means; and means for sensing and signalling said bed movement, said control means deactuating said bed moving means cooperatively with said sensing and signalling means.

10. Apparatus as defined in claim 8 including, brake means for arresting said relative movement and actuated by said control means upon deactuation of said relative movement effecting means.

11. Apparatus for gauging work lengths which comprises:

a base having an end adapted to be disposed adjacent a tool operating on the work;

a work bed;

means mounting said bed on said base for reciprocal rectilinear movement thereon to and from said end thereof;

a plurality of work stops mounted on said bed for reciprocal movement between respective work-engaging positions at predetermined different distances along the bed in the direction of said bed movement and out of the way positions;

means for reciprocally moving said stops individually between said positions;

remote control means for selectively actuating said stop moving means;

brake means for arresting said bed movement;

means for gauging selected distances of said bed movement; and means cooperative with said gauging means for actuating said brake means at gauged distances of said bed movement.

12. Apparatus as defined in claim 9 including, brake means for arresting said bed movement and actuated by said control means upon deactuation of said bed moving means.

13. In combination with a cutoff tool, apparatus for gauging work lengths which comprises:

a base disposed adjacent said tool;

a work bed;

means mounting said bed on said base for reciprocal rectilinear movement thereon to and from the cutting plane of said tool;

a plurality of work stops mounted on said bed for reciprocal movement between respective work-engaging positions at predetermined different distances along the bed in the direction of said bed movement and out of the way positions;

means for reciprocally moving said stops individually between said positions;

remote control means for selectively actuating said stop moving means;

brake means for arresting said bed movement;

means for gauging selected distances of said bed movement; and means cooperative with said gauging means for actuating said brake means at gauged distances of said bed movement.